Figure 1:
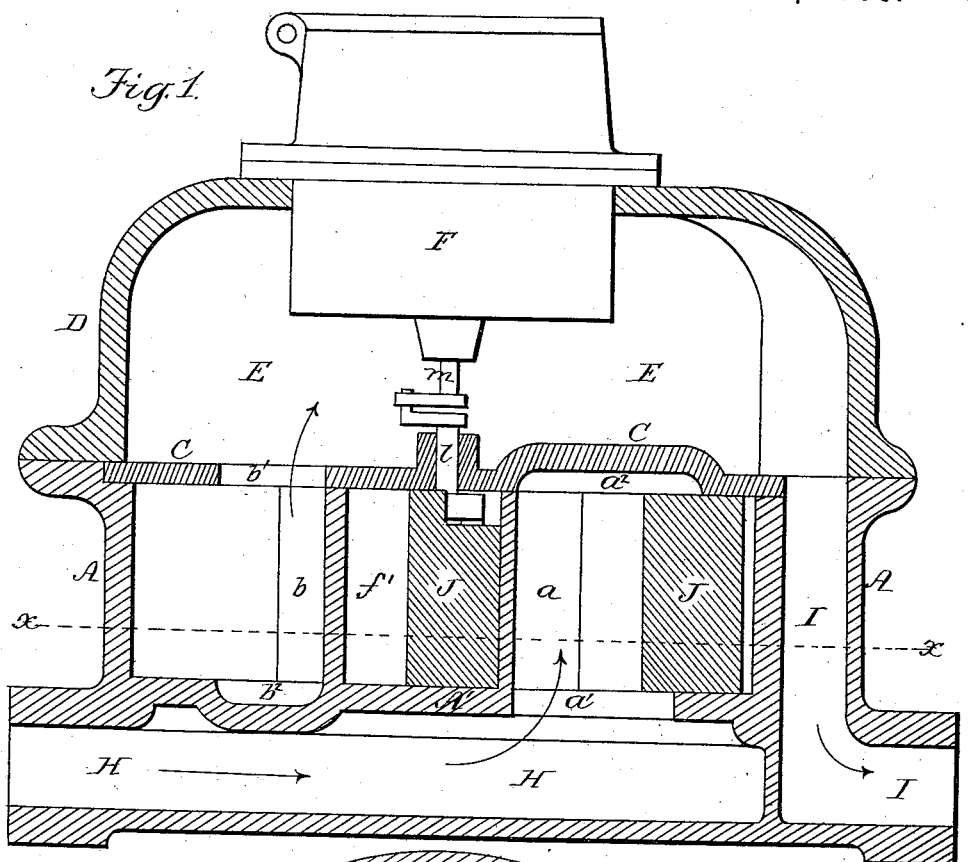

(No Model.)  5 Sheets—Sheet 1.

L. H. NASH.
WATER METER WITH REVOLVING PISTON.

No. 336,144.  Patented Feb. 16, 1886.

WITNESSES  
G. E. Tucker  
W. E. Chaffee

INVENTOR  
Lewis Hallock Nash,  
by Johnson and Johnson  
Attorneys.

(No Model.) 5 Sheets—Sheet 2.

L. H. NASH.
WATER METER WITH REVOLVING PISTON.

No. 336,144. Patented Feb. 16, 1886.

WITNESSES
INVENTOR
Lewis Hallock Nash
by Johnson & Johnson
Attorneys.

(No Model.) 5 Sheets—Sheet 3.
L. H. NASH.
WATER METER WITH REVOLVING PISTON.
No. 336,144. Patented Feb. 16, 1886.

WITNESSES
G. E. Tucker
W. C. Chaffee

INVENTOR
Lewis Hallock Nash
by Johnson and Johnson
Attorneys.

(No Model.) 5 Sheets—Sheet 5.

L. H. NASH.
WATER METER WITH REVOLVING PISTON.

No. 336,144. Patented Feb. 16, 1886.

WITNESSES
INVENTOR
Lewis Halock Nash,
by Johnson and Johnson
Attorneys.

UNITED STATES PATENT OFFICE.

LEWIS HALLOCK NASH, OF BROOKLYN, ASSIGNOR TO THE NATIONAL METER COMPANY, OF NEW YORK, N. Y.

WATER-METER WITH REVOLVING PISTON.

SPECIFICATION forming part of Letters Patent No. 336,144, dated February 16, 1886.

Application filed November 3, 1885. Serial No. 181,774. (No model.)

*To all whom it may concern:*

Be it known that I, LEWIS HALLOCK NASH, a citizen of the United States, residing at Brooklyn, in the county of Kings and State of New York, have invented new and useful Improvements in Water-Meters, of which the following is a specification.

My improvement relates to that class of meters in which a piston having a number of bearing-points and recesses operates within a case having an equal number of bearing-points and recesses, and in which each of the piston-points is perpetually in contact with the corresponding case-recess during the entire movement of the piston, and the case points or projections are in perpetual contact with the piston-recesses at some points also during the entire movement of the piston. By this construction each case and piston recess is perpetually divided into enlarging and contracting spaces by the projection that enters it, and inlet and discharge communicating passages are provided for every case-chamber, so that in the revolution of the piston it operates perpetually to separate the inlet-passage from the outlet-passage in all its movements. By this construction it is not necessary to control the flow through either of these supply or discharge passages, because, on account of the joint-forming action of the piston in every measuring-space of both the piston and the case, there will never be communication between the inflowing and outflowing streams, even though these passages have perpetual communication with the case-chamber, because the piston always makes a joint separating the inlet from the outlet passage.

In an application for a patent filed by me October 16, 1885, under Serial No. 180,083, I have shown and described such a meter, and my present improvement is directed to such a construction and arrangement of the ports and inlet-passages by which to relieve the central spindle from all strain caused by the action of the water in forcing the piston away from contact with the case and causing wear upon the central spindle.

My improvement also embraces an arrangement and construction of inlet and outlet passages by which greater capacity is given to them for the free and quiet filling of the receiving and discharging chambers, whereby the friction and resistance of the flowing streams are greatly reduced and the consequent resistance to the rapid movement of the piston is avoided.

To clearly set forth my improvements I have shown a piston and case having three bearing-points only; but I prefer in practice to construct the meter with a greater number of points and recesses, which act in the same manner as those shown and described.

My present improvements are particularly directed to the construction of water-meter shown and described, but not claimed, in a patent granted to H. F. Gaskill, March 17, 1885, No. 313,860, in which the piston has a revolving non-rotating movement making perpetual contact with case-recesses and case projections making perpetual contact with piston-recesses; and my improvements in such meter are in the inlet and the outlet ports in the meter-case by which to cause the piston always to bear upon the case, to relieve the piston-connection with the registering mechanism of strain, and to give a free and uniform movement to the piston.

Figure 2:
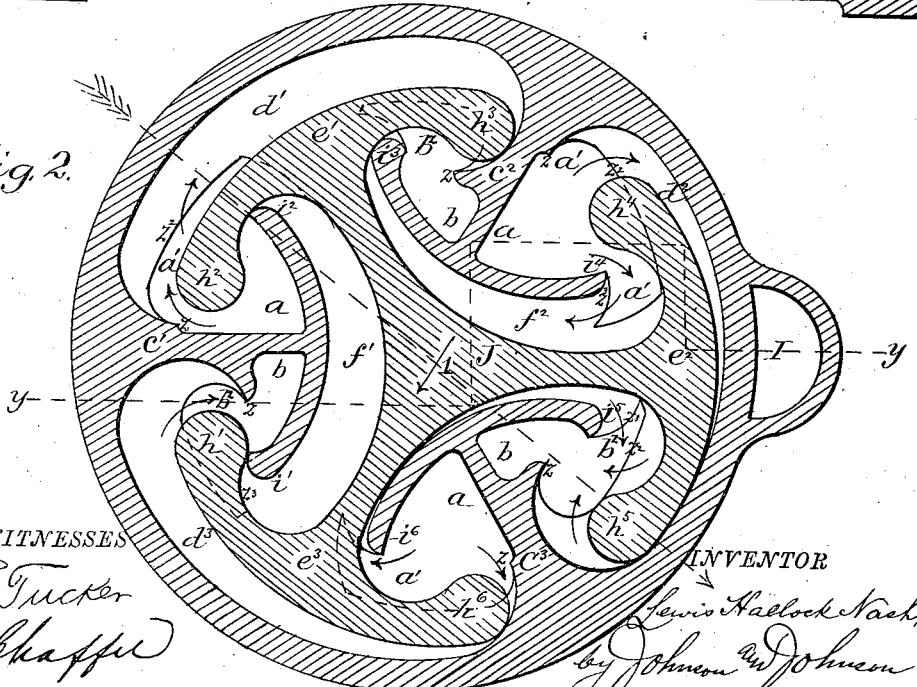
Figure 4:
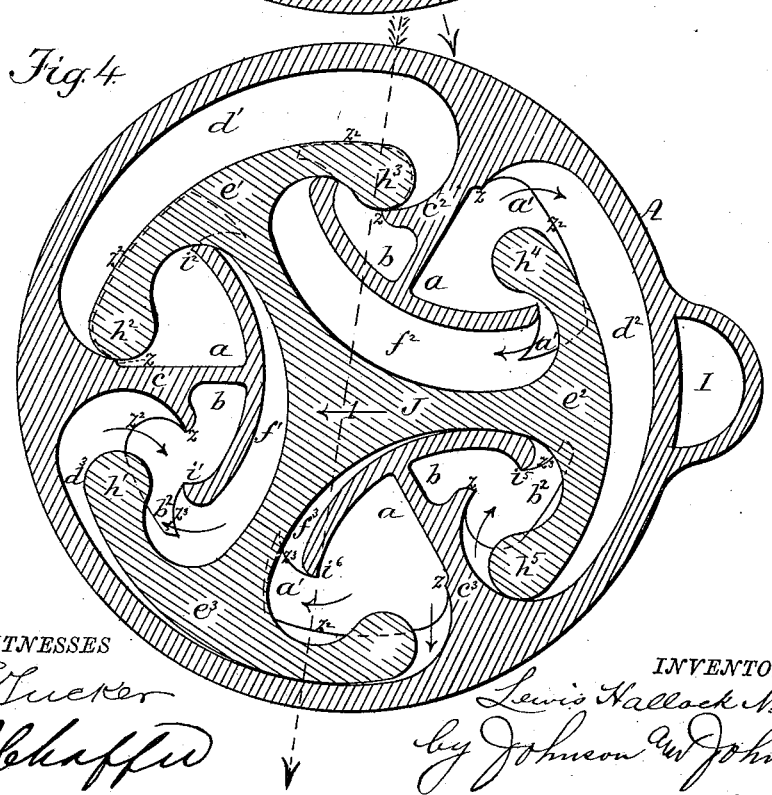
Figure 5:
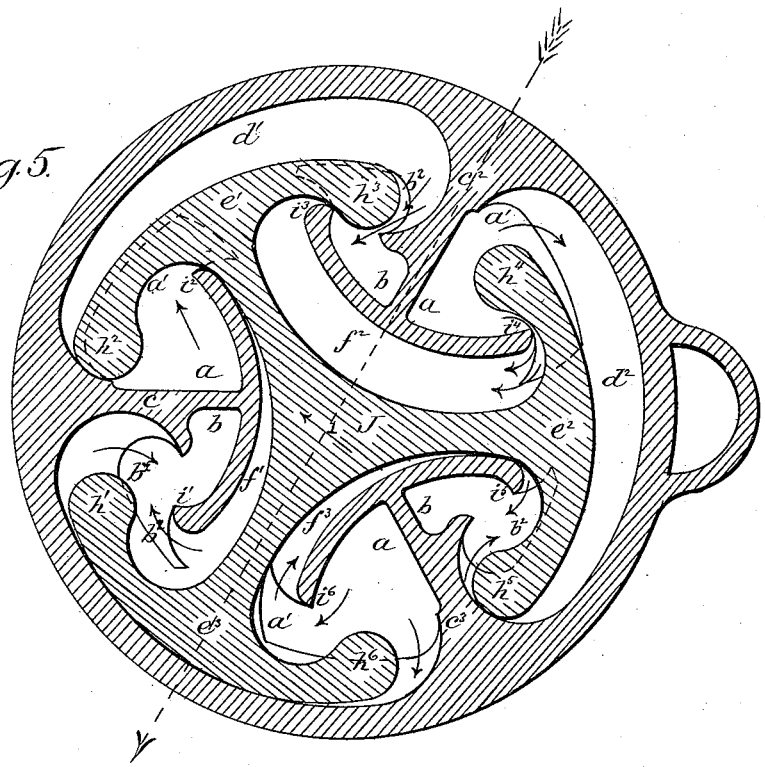
Figure 6:
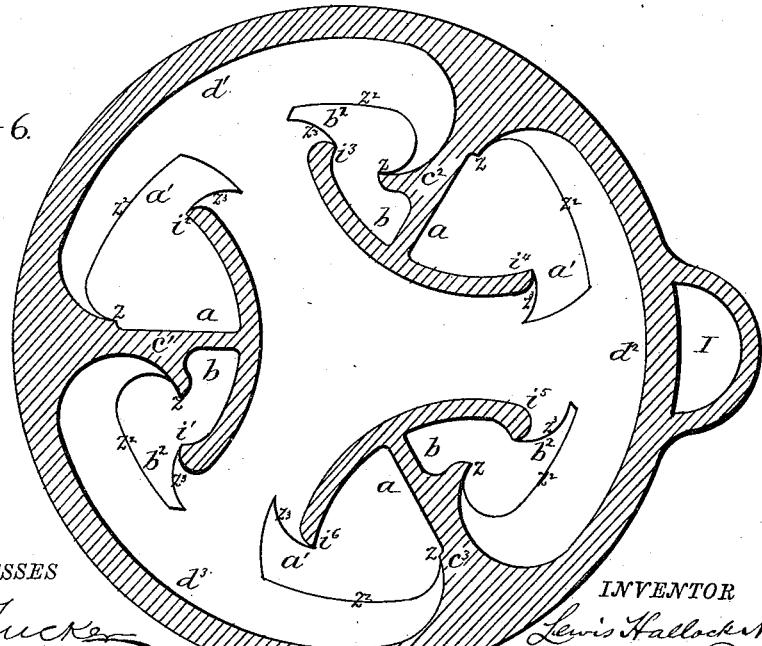
Figure 7:
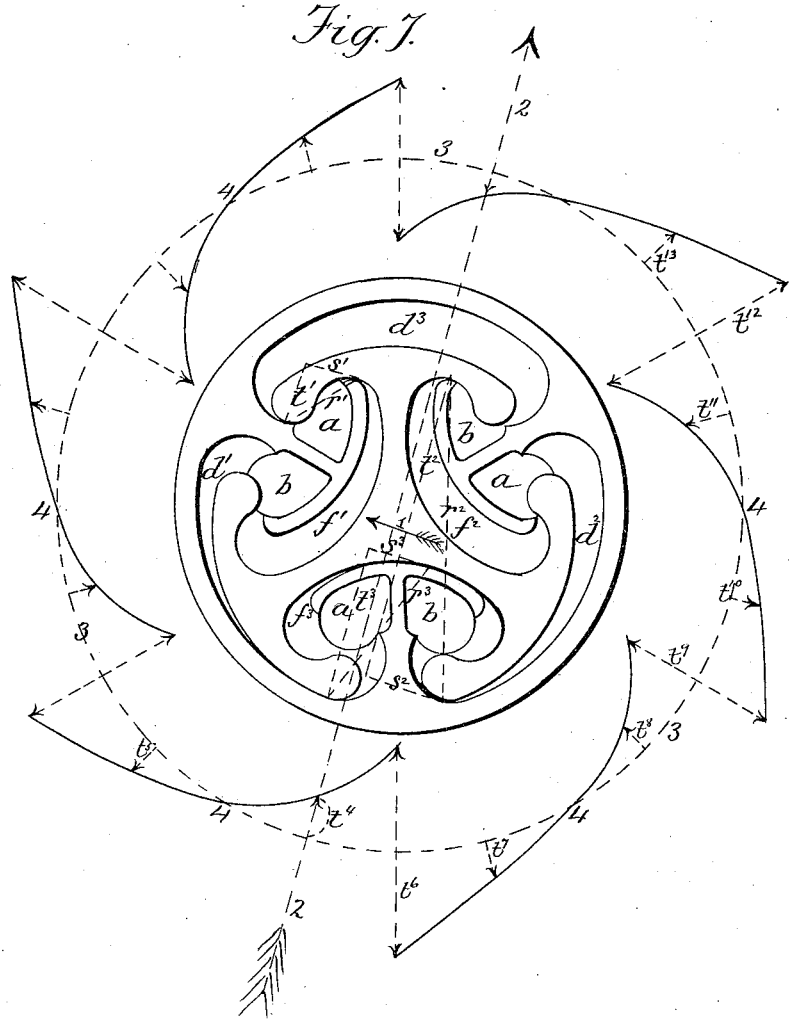
Figure 8:
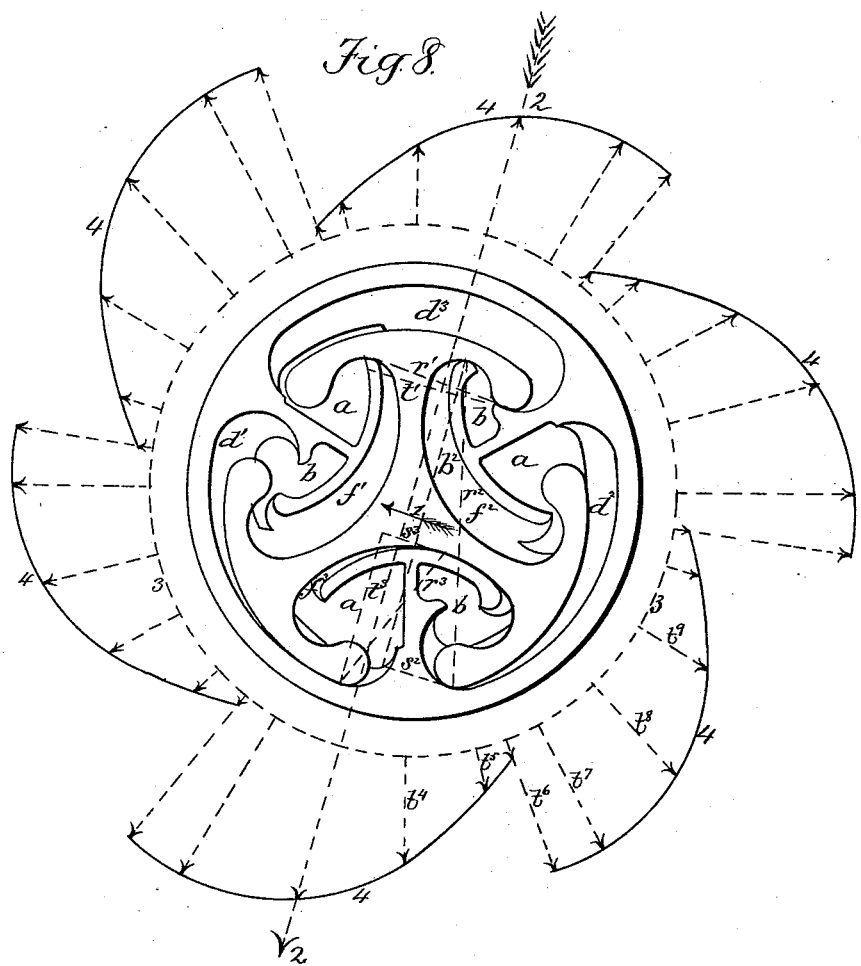

Referring to the drawings, Figure 1 represents a vertical section, on the line $y\ y$ of Fig. 2, of a meter having my improvements. Figs. 2, 3, 4, and 5 are horizontal sections of the same on the line $x\ x$ of Fig. 1, showing the piston in different positions. Fig. 6 is a section of the case, showing the parts with the piston removed. Fig. 7 is a diagram illustrating the action of the water in holding the piston against the case or forcing it against the spindle, in a meter having the parts and construction shown and described in my said application of October 16, 1885; and Fig. 8 is a similar diagram illustrating the action of the pressure of the water upon a piston having my improved ports or passages.

The meter consists of an inclosing-case, A, having a lower head-plate, A', and an upper separate head-plate, C. The case has a cover, D, inclosing a chamber, E, which serves as an outlet-passage, while a bottom case-passage forms the inlet H, which communicates through the ports $a'$ with the measuring-spaces of the case. An outlet-passage, I, communicates with chamber E, through which the water escapes.

The top plate, C, has the ports $b'$, which open into the case-measuring spaces, and also the recess-ports $a^2$, formed directly over the ports $a'$ in the lower head, and which are of the same shape and size.

The case-chamber is formed with the bearing projections $c'$ $c^2$ $c^3$, which inclose the ports or passages $a$ and $b$, which latter communicate with the head-ports $a'$ and $b'$, and between these points recesses $d'$ $d^2$ $d^3$ are formed.

The piston has projecting bearing-points $e'$ $e^2$ $e^3$, which enter each case-recess and make perpetual joint forming contact therein between the movement of the piston, and between these projections are formed the recesses $f'$ $f^2$ $f^3$, which make perpetual contact with the case projections $c'$ $c^2$ $c^3$ in all movements of the piston; hence there is always a point of contact between the piston and the case separating the inlet-ports $a$ $a'$ from the outlet-ports $b$ $b'$ in all positions of the piston.

Figure 3:
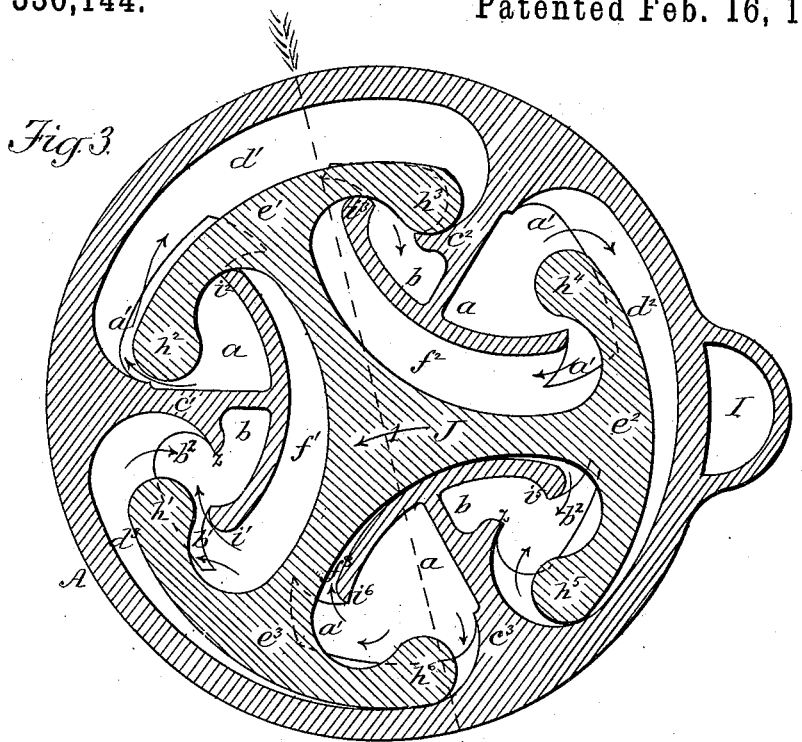

When the piston is in position Fig. 2, at the time when any interior piston-chamber, as $f'$, is about to change from a receiving to a discharging chamber, the bearing ends $i'$ $i^2$ of the case projection $c'$ are both in contact with the walls of the recess-chamber $f'$, and at the same time the piston ends $h'$ $h^2$ have covered the head-ports $a'$ and $b'$, so that the communication with said chamber $f'$ is cut off until the piston has moved enough toward the position of Fig. 3 to open communication between chamber $f'$ and the outlet-ports $b$ $b'$, as shown in said figure. When the piston is in position so that any case-chamber, as $d'$, is about to change from a receiving to a discharging chamber, as $d'$ in Fig. 4, the piston-arms $h^2$ $h^3$ have closed all communication between said chamber $d'$ and the inlet and discharge ports $a$ $a'$ $b$ $b'$, and as soon as the piston continues to move toward the position, Fig. 5, the water escapes through ports $b$ $b'$, as shown by the arrows.

It will be seen that the vertical ports $a$ and $b$, formed by the arms of the case projections, operate in the same manner as the head-ports $a'$ and $b'$, and that by adding the ports $a'$ and $b'$, I obtain the advantage over the use of the ports $a$ and $b$ alone, as shown in my said application, of a much greater capacity to the entrance-ports, and hence the water can flow into and out of the measuring-chambers with a much easier motion and less resistance, whereby the strain upon the moving piston will be greatly lessened, and consequently there will be greater accuracy of measurement and less wear upon the parts.

While I prefer to use the combined ports, it will be understood that it is possible to operate the meter with the ports $a$ and $b$ alone, or the ports $a'$ and $b'$ alone.

It will be seen by reference to the figures that the inlet-ports $a$ $a'$ are so formed as to remain open to the measuring-chambers $d'$ $f'$, &c., for a greater movement of the piston than the discharge-ports $d$ $d'$ are, and that when the chambers $d'$ or $f'$ change from a receiving to a discharging chamber the said chambers have passed their point of greatest capacity and are beginning to contract. The object of this arrangement of ports will be clearly set forth by the study of the action of the pressure of the water upon the pistons in Figs. 7 and 8, as follows:

Fig. 7 shows the form of piston shown and described in my application, in which the ports $a$ and $b$ are symmetrical, and the recess-spaces $d'$ and $f'$, &c., change from receiving to discharging spaces at the instant when the said chambers are at their greatest capacity. The piston being in the position shown in this figure, the large arrow 2 will show the line normal to the contacting-surfaces of the piston and the cylinder, and the arrow 1 shows the direction of the movement of the piston at this time, which direction is at right angles to the normal line 2. In order to show the action of the pressures of the water upon the piston between the various receiving and discharging chambers, the two points of contact between the piston and case which separate a filling-space from a discharging-space are joined by dotted lines $r'$ $r^2$ $r^3$. These lines represent the surface of the piston which is subjected to pressure, which pressure acts at right angles to the said lines. In order to determine what part of these pressures is exerted to drive the piston in the direction of the arrow 1 and what part of the pressure is exerted in the direction of the dotted line 2, either in pressing the piston in contact with its case or in forcing the piston away from contact with the case, the dotted lines $s'$ $s^2$ $s^3$ are drawn parallel to the arrow 1 and the dotted lines $t'$ $t^2$ $t^3$ are drawn in the direction of the line 2. Now, by the well-known laws of the triangle of forces the algebraic sum of the pressures on the lines $s'$ $s^2$ $s^3$ represents the force acting to move the piston in the direction of the line 2. In order to clearly show the action of the water upon the piston in all positions of its movement, a dotted circle, 3, is drawn around the figure, which circle represents the zero-line, from which all the pressures normal to the motion of the piston are measured, and from this line is measured off the line $t^4$, equal to the algebraic sum of the pressures upon lines $s'$ $s^2$ $s^3$ and in the direction of the said pressures. This line $t^4$ represents the resultant pressure tending to move the piston in the direction of the arrow-head on line $t^4$. Similarly the lines $t^5$ $t^6$, &c., are found showing the action of the pressures upon the piston for other portions of its movement, and these points are connected by the curved line 4; hence this curved line 4 shows what the normal effect of the water is upon the piston for every position of its movement. When the line 4 is outside of the zero-line 3, it shows the effect of the pressure to force the piston against its case and away from the central bearing. On the other hand, if the curved line 4 is within the zero-line 3, it shows the effect of the normal pressure to force the piston away from the case and against the central spindle. Thus it it will be seen that in the movement of the piston from one bearing-point to another it is held against the case by the pressure of the water during one half its movement, but that for the other half of said movement it is pressed away therefrom by the pressure. This Fig. 7 illustrates the action of the pressure upon a piston such as is shown and described in the patent to Gaskill, before referred to, and in my said application.

Fig. 8 illustrates the effect of the pressure of the water in a meter having my improvement. By prolonging the opening of the inlet-ports and closing to a corresponding extent the outlet-ports the line 4 of pressure outside of the zero-line (showing the effect in holding the piston against the case) is increased and that portion of the curve within the zero-line is correspondingly decreased. By properly constructing these ports, as shown in said figure, the whole of the inward pressure of the water upon the piston may be removed and thus the wear of the spindle be prevented.

Referring to Figs. 2, 3, 4, and 5 it will be seen that the ports $a'$ and $b'$ are so placed in the lower and upper heads that the piston ends $h'$ $h^2$, &c., pass across these ports first on one side and then on another, so that they communicate alternately with the case-chambers $d'$, &c., and with the piston-chambers $f'$, &c., in the operation of the piston, and they thereby serve to give a very free entrance and escape, which is an advantage that these ports possess in a high degree, and the meter is capable of operating with these ports alone without the aid of the ports $a$ and $b$. When so operating, the water will enter, as shown in Fig. 1, from the lower passage, H, through the ports $a'$ into the measuring-chambers, and escape through the posts $b'$ and chamber E and passage I. This construction allows of simplicity in the manufacture of the meter.

The operation of the meter is as follows: This piston being in position Fig. 2, water enters from ports $a$ and $a'$ into chambers $d'$ $d^2$ $f^2$, driving the piston in the direction of arrow 1, and the water escapes from chambers $d^3$ $f^3$. At this time piston-chamber $f'$ is cut off from both inlet and discharge; but as soon as the piston moves toward the position of Fig. 3 the water enters chambers $d'$ $d^2$ $f^2$ $d^3$ $f^3$ and escapes from chambers $d^3$ $f''$ $f^3$ through the ports $b$ $b'$, as shown by arrows, driving the piston into the position Fig. 4. In this figure chamber $d'$ is closed and water enters chambers $d^2$ $f^2$ $f^3$ and escapes from chambers $f'$ $d^3$ $d^2$, as shown by the arrows, driving the piston into position of Fig. 5, at which time water enters chambers $d^2$ $f^2$ $d^3$ $f^3$ and escapes from chambers $d'$ $f'$ $d^3$, as shown by the arrows, moving the piston into the same relation with regard to chamber $f^2$ as is shown in Fig. 2 in relation to chamber $f'$, and the action of the piston continues as before. The registration is effected through the crank-shaft $l$ and $m$ to the mechanism contained in box F.

Referring to the recess-ports $a^2$ in the top plate, C, they are formed of the same port edge outline as the corresponding ports, $a'$, in the lower head, and they communicate with the ports $a$, formed by the case projections, so that the water can flow through said projection ports $a$ to the said recesses. In such action the ports $a$ act as passages connecting the inlet-passage H with the port $a^2$, and thus secure an entrance for the water from ports in both the upper and lower heads at the same time. The recesses $b^2$ in the lower head are formed and act in the same manner in relation to the ports $a$ as the upper head recesses.

By "prolonging the head-ports" I mean their prolonged period of communication with the measuring-spaces, for in Fig. 7 these ports are adapted to be closed at the instant the piston-chambers $d'$, &c., are at their greatest capacity, and at the same time the corresponding ports, $b'$, are opened. At such instant, as seen in this figure, the pressure upon the piston changes from forcing the piston against the case to forcing the piston away from the case, and for this purpose the shape of the ports is determined by the outline and position of the piston, so that the latter uncovers one at the instant it closes the other.

By prolonging the communication of the inlet-water with the measuring-spaces both within and without the piston for a time after said chamber has reached its greatest capacity, a point is reached in the movement of the piston wherein at the change of the ports from inlet to outlet the resultant pressure will still hold the piston in contact with its case. The matter of improvement in this consists in forming the inlet-ports so that they will have free communication in the measuring-spaces until the piston has reached such a position (referred to in Fig. 7) as that when the inlet-port is closed and the corresponding outlet-port opened the pressure upon the piston will cause it to press against the case instead of away from it, as illustrated in Fig. 8.

I have stated that the inlet-ports $a$ $a'$ are located and formed so as to admit the water to the measuring-chambers after the latter have begun to contract, and that the outlet-ports $b$ $b'$ are located and formed so as to open the instant the inlet-ports close, and it will be understood that this is a necessity on account of the swift movement of the piston and from the fact that it would otherwise have to act against a closed body of water in the space just closed. This action is illustrated in Figs. 3, 4, and 5, and, as thus shown, is effected by extending the head-ports $a'$ farther into the chamber-spaces than the head-ports $b'$, and by widening the ports $a'$ and correspondingly narrowing the ports $b$, as shown in Fig. 6. The acting edges $z$ of the ports which control the admission to the exterior case-chambers, $d'$, &c., are determined by the position of the piston at the instant the measuring-space changes from a receiving to a discharging space, as shown in Fig. 4, wherein the vertical edges $z$ are in contact with the piston-bearing points $h^2$ $h^3$, and the port edges $z^2$ are determined by the conformation of the convex bearing-surfaces $e'$, &c., so that as the one closes the other is ready to open. In the same manner the acting edges $z^3$ $i'$ $i^2$, &c., which control the admission to the interior measuring-chambers, $f'$, &c., are determined by the position of the piston at the instant the said interior measuring-chambers are about to change from receiving to discharging spaces, as shown in Fig. 2, in which the vertical edges $i'$ $i^2$, &c., are tangent to the piston-bearing points, and the head-port edges $z^3$ are determined by the interior walls, $f'$, &c. The meter can be used with the same results with the ports $a$ and $b$, or $a'$ and $b'$, or with these ports combined, as shown.

I claim—

1. In a water-meter, the case-heads A' and C, each having the inlet-ports $a'$ $a^2$ and the outlet ports $b'$ $b^2$ outside of the bearing-points of the case projections, in combination with a case, and the piston having equal number of bearing projections making perpetual joint forming contact with corresponding recesses in both piston and case, whereby the piston and case projections operate to separate the inlet from the outlet ports in all positions of the piston.

2. In a water-meter, the case heads A' and C, each having the inlet-ports $a$, prolonged to form the ports $a'$, and the outlet-ports $b$, prolonged to form the ports $b'$, in combination with a case having the wall bearing projections containing the ports $a$ and $b$, and a piston having equal number of bearing projections corresponding with case-recesses, whereby the piston and case projections perpetually separate the inlet from the outlet ports.

3. The combination, with the case and the piston having equal number of bearing projections making perpetual joint forming contact with corresponding recesses in both piston and case, of the inlet-ports $a$ $a'$ and the outlet-ports $b$ $b'$, the inlet-ports being located and formed to admit the water to the measuring-chamber after the latter begins to contract, and the outlet-ports located and formed to open the instant the inlet-ports close.

4. In a water-meter, the case having the extended inlet-ports $a'$ and the correspondingly-contracted outlet-ports $b'$, and the ports $a$ $b$, formed in the case projections, in combination with the piston having equal number of projections making perpetual contact with the case, substantially as described, for the purpose specified.

5. In a water-meter, the case having the inlet-ports $a$ of greater width of opening than the outlet-ports $b$ in the case-wall projections, in combination with a piston having equal number of projections making perpetual contact with the case, substantially as described, for the purpose specified.

6. In a water-meter, the case having the inlet-ports $a$ $a'$ of greater width of opening than the outlet-ports $b$ $b'$, in combination with the piston having equal number of projections making perpetual contact with the case, substantially as described, for the purpose specified.

7. In a water-meter, the case having the vertical inlet-ports $a$ and $b$, bounded by the bearing-points $i'$ $i^2$, &c , and $z$ $z$, and the head port edges $z^2$ $z^3$, the said bearing-points $z$ $z$ being of unequal projection, in combination with the piston having equal number of projections making perpetual contact with the case, substantially as described, for the purpose specified.

In testimony whereof I have hereunto set my hand in the presence of two subscribing witnesses.

LEWIS HALLOCK NASH.

Witnesses:
H. W. BRINCKERHOFF,
WILLIAM C. WESTERVELT.